April 17, 1962  N. W. MAGYAR  3,029,735
RELEASE MECHANISM
Filed May 19, 1959  2 Sheets-Sheet 2
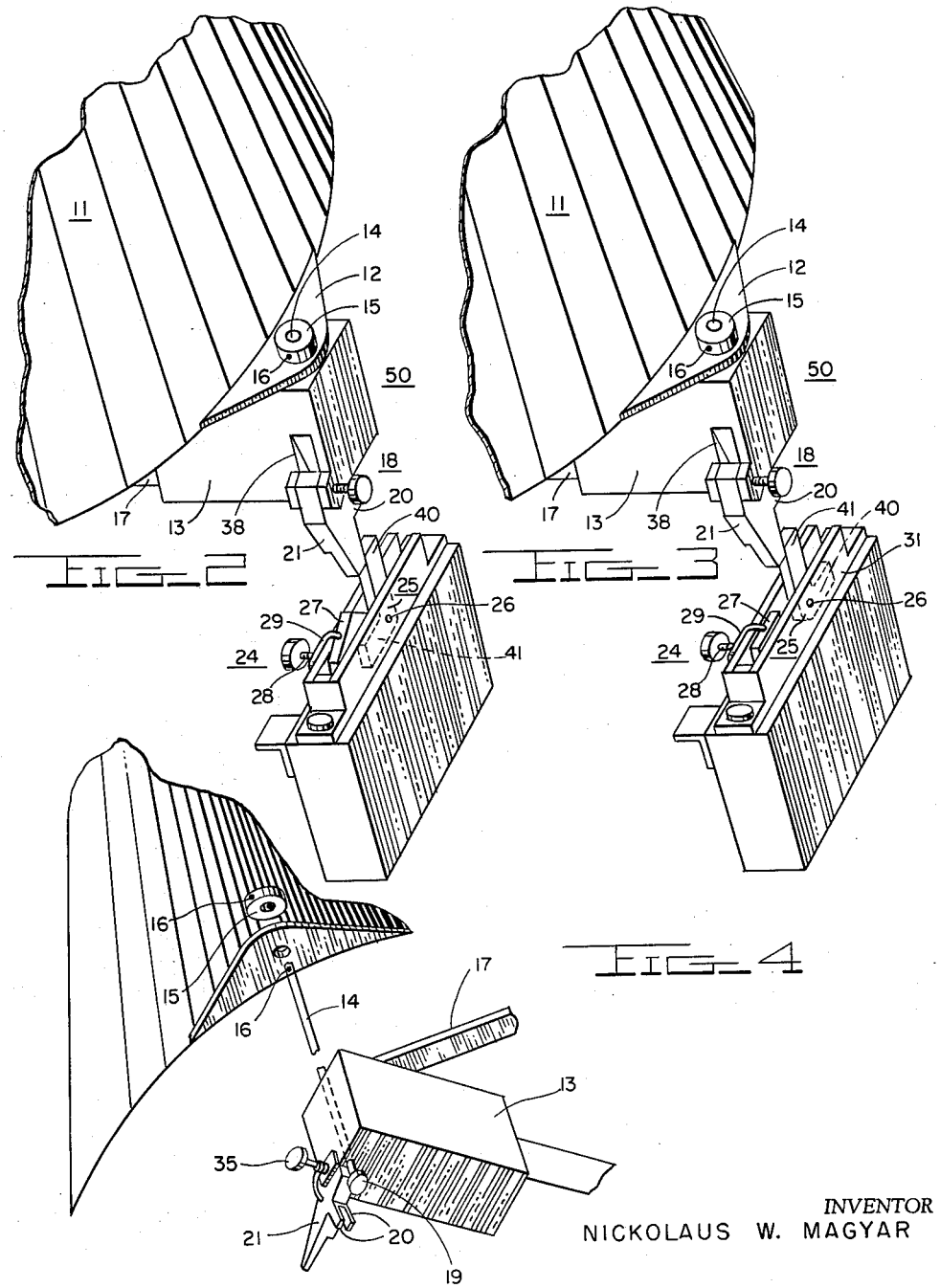
INVENTOR
NICKOLAUS W. MAGYAR
BY Richard C. Reed
ATTORNEY United States Patent Office 3,029,735
Patented Apr. 17, 1962

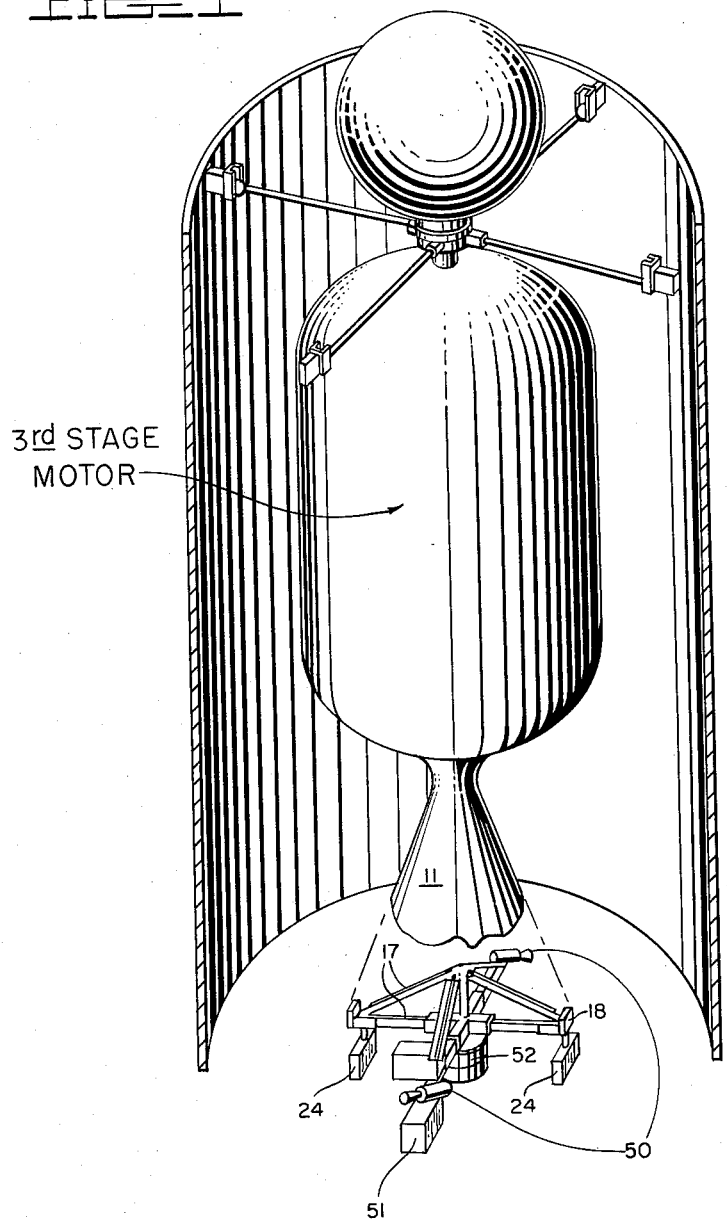

3,029,735
RELEASE MECHANISM
Nickolaus W. Magyar, Baltimore, Md., assignor, by mesne assignments, to the United States of America as represented by the Secretary of the Navy
Filed May 19, 1959, Ser. No. 814,361
16 Claims. (Cl. 102—49)

This invention relates in general to release mechanisms and more particularly to a spin release mechanism.

In the field of space exploration through multi-stage rockets one of the problems encountered is that of releasing an expended stage of the rocket from the remaining assembly. Such a release is often initiated during a period when the assembly is coasting along a path parallel to the earth's curvature awaiting actuation of the next propulsion stage, and must be accomplished with a minimum of disturbance. Prior devices for releasing a stage or performing a comparable task have included timing devices, sequence switching and power operated holding and release mechanisms whose complexity increases the possibility of malfunction and which add weight and occupy space that could be used more advantageously. The present invention obviates the disadvantages of prior devices and provides a simple, compact mechanism which accurately performs the functions previously accomplished by a combination of devices.

Accordingly, it is an object of the present invention to provide a releasing mechanism that will release one object from another with a minimum of disturbing force.

Another object of this invention is to provide a releasing device that incorporates a predetermined time delay in a simple, compact mechanism.

A further object of the present invention is to provide a simplified release mechanism that can be adapted to cooperate with a spinning object.

Other objects and advantages of this invention will become apparent upon a careful consideration of the following description, when read in conjunction with the accompanying drawings in which:

FIG. 1 is an isometric view of a first embodiment of the invention incorporated in a rocket assembly.

FIG. 2 shows an isometric view partly in section of the first embodiment shown generally in FIG. 1.

FIG. 3 is an isometric view of the components shown in FIG. 2 after one and a fraction revolutions of the spin table contained in the second stage of the rocket.

FIG. 4 is an isometric view of a component shown in FIG. 2 after two revolutions of the spin table contained in the second stage of the rocket.

In accordance with the teachings of the present invention a spin release mechanism is provided that will mechanically disconnect a component of a rocket from the remainder of the rocket with minimum disturbance to the disconnected components. The separation of components is accomplished in a desired time interval by the interaction of a lever and a trigger during two revolutions of a spin table to which the lever is attached, the lever when actuated shearing a pin which is the final remaining linkage between the two components to be separated. In a preferred embodiment, two identical release mechanisms are installed 180° apart on the periphery of one of the components with separation accomplished by identical pins being sheared simultaneously.

Referring to FIG. 1, cone 11 of the 3rd stage motor rests upon spin table 17 which in turn is supported by the second stage of the rocket. Miniature rockets 50 are attached to opposite projections of the spin table making them, in a preferred embodiment, disposed 180° apart. A positioning mechanism 51 and engine support 52 are also shown in FIG. 1. It will be appreciated that neither positioning mechanism 51 nor engine support 52, which is attached to the second stage of the rocket, are components of the present invention, however, they are included to more clearly describe the operation of the invention. Two lever assemblies 18 and two trigger assemblies 24 complete the operable parts shown in this figure.

Referring to FIG. 2, cone 11 of the third stage rocket motor has a flange 12 extending therefrom to which a projection 13 of spin table 17 is attached by bolt 14, sleeve 15 and shear pin 16. The bolt, sleeve and shear pin are components of lever assembly 18 which also includes lever 21 having prongs 20 against which the head 19, shown in FIG. 4, of bolt 14 is seated and through which bolt 14 passes. Lever 21 and prongs 20 are shown more in detail in FIG. 4. Projection 13 is grooved at 38 to accommodate lever 21 when the lever is rotated clockwise. Situated below projection 13 and attached to the second stage of the rocket is trigger assembly 24 comprising trigger 25, having tangs 40 and 41 and pivoting about pin 26, and keeper 27, which pivots about shaft 28 and has attached to it spring 29. The foregoing components in a preferred embodiment are of rigid material, preferably metal.

In FIG. 3, the components illustrated in FIG. 1 are shown after nearly two revolutions of the spin table have been completed. Tang 40 of trigger 25, shown in contact with lever 21 in FIG. 2, is seen resting against stop 31, while tang 41 of trigger 25, shown under keeper 27 in FIG. 2, is seen in contact with lever 21. Keeper 27 now in position to the left of trigger 25 is held there by spring 29.

In FIG. 4, projection 13 is shown with attachments thereto after more than two complete revolutions of the spin table. Lever 21 is shown after having pivoted about bolt 35, while bolt 14 and prongs 20 have been moved away from projection 13. Shear pin 16 is shown severed, and sleeve 15 is shown disconnected from the assembly.

Prior to operation of the invention the spin table upon which the assembly to be separated rests is set in rotation, in a preferred embodiment by firing two miniature rockets disposed tangent to the periphery of the spin table. At the time of firing, lever 21 is positioned against the opposite side of tang 40 of trigger 25 from its position shown in FIG. 2, otherwise the components are as shown in that figure. Keeper 27 in the position shown in FIG. 2 has spring 29 under tension holding tank 41 under it against assembly 24. Upon firing of the rockets, the spin table and lever 21 will arrive at the position shown in FIG. 2, with the lever in contact with trigger 25. In continuing around, lever 21 forces trigger 25 to pivot about pin 26 which movement causes tang 41 to move outward from the trigger assembly against keeper 27 increasing the tension in spring 29 until tang 41 clears the spring loaded keeper 27. When tang 41 is clear of keeper 27, spring 29 returns the keeper to a position against the trigger assembly once occupied by tang 41. In this position, keeper 27 prevents return of the trigger to its original position. The trigger is prevented from rotating more than one-fourth of a revolution by stop 31 on the trigger assembly and thus is armed to actuate lever 21.

At the point now reached in its operation, the trigger is armed and in position to effect separation of the upper assembly, in a preferred embodiment the third stage motor, from the spin table. When lever 21 completes its second revolution it impacts against trigger 25 which now serves as a positive stop and forces rotation of the lever about bolt 35. As shown in FIG. 4, rotation of lever 21 forces prongs 20 and head 19 of bolt 14 out from projection 13 severing shear pin 16 which is the last remaining part holding projection 13 to the upper assembly. In a preferred embodiment the release of the upper assembly, i.e. the third stage motor, is thus effected when a desired number of rotations and a force sufficient to shear have been attained. It will be appreciated that other means, e.g. a spring loaded force with or without separate timing, may be used to provide the shearing force. It is to be understood that the releasing mechanism described can be used to release other objects than a rocket motor, and that rotation of the spin table can be accomplished other than by use of miniature rockets. It is also to be understood that a basis other than rotation, e.g. time, can be the reference for determining actuation after two revolutions of the spin table. It is possible, of course, to have the release mechanism actuated after one revolution, or after three or more revolutions, of the spin table. And it is also possible that a component other than a spin table can be used to impart rotation to the assembly to be separated.

Many modifications and variations of the present invention are possible pursuant to the above teachings. It is therefore to be understood that within the scope of the appended claims the invention may be practiced otherwise than as specifically described.

What is claimed is:

1. A spin release mechanism for mechanically releasing a first object from a second object comprising a shear assembly with shear means having a predetermined resistance to shear, said shear assembly including a bolt having a head at a first end and a second end adapted to receive said shear means, retaining means on said second object including a bore for permitting passage therethrough of said bolt, a flange on said first object adapted to permit passage therethrough of said bolt, and shear operating means pivotably positioned on said retaining means, said shear operating means having lever means inserted between the head of said bolt and said second object for exerting force axially along said bolt in a direction away from said first object, said bolt having a selected length such that upon positioning of said shear means in said second end said second object will be held in place against said first object, said shear operating means when pivoted in a selected direction causing said lever means to axially move the head of said bolt in a direction away from said shear means which motion will move said second end through said flange, shearing said shear means and releasing said first object from said second object.

2. A spin release mechanism for mechanically releasing a first object from a second object wherein the second object is rotatably mounted on a third object comprising a shear assembly mounted on said second object and including shear means having a predetermined resistance to shear, said shear assembly including a bolt having a head at a first end and a second end adapted to receive said shear means, a flange on said first object adapted to permit passage therethrough of said second end of said bolt, shear operating means pivotably positioned on said shear assembly, said shear operating means having lever means inserted between the head of said bolt and said second object for exerting force axially along said bolt in a direction away from said first object, said bolt having a selected length such that upon positioning of said shear means in said second end said bolt will hold said second object in place against said first object, rotating means mounted on said second object for rotating said second and first objects with respect to said third object, and actuating means mounted on said third object and movable in a selected direction for pivoting said shear operating means in a direction opposite said selected direction thereby causing said lever means to axially move the head of said bolt away from said shear means drawing said second end of said bolt through said flange shearing said shear means and releasing said first object from said second object.

3. The device claimed in claim 2 wherein said actuating means includes striking means for striking said shear operating means, said striking means rotatable about a shaft mounted on said third object, said striking means having at least one tang disposed to intercept said shear operating means upon rotation of said second object with respect to said third object.

4. A spin release mechanism for mechanically releasing a first object from a second object wherein the first object and second object are held in place together by a bolt assembly and the second object is rotatably mounted on a third object comprising rotating means positioned on said second object for providing rotation thereof, a shaft on said second object, a lever arm pivotable about said shaft and extending from said second object toward said third object, said bolt assembly including shear means operable to shear at a predetermined shear stress, shear actuating means connected to said lever arm and positioned in said bolt assembly to cause shear of said shear means, intercepting means on said third object positioned to intercept and to pivot said lever arm upon completion of one rotation of said second object, said lever arm positioned on said second object such that upon being pivoted about said shaft by interception with said intercepting means said shear means will shear and free said first object from said second object.

5. A spin mechanism for mechanically releasing a first object from a second object wherein the second object is rotatably mounted on a third object comprising rotating means positioned on said second object for providing rotation thereof, said second object having a first shaft mounted thereon, a lever arm pivotable about said first shaft and having a pair of prongs extending substantially perpendicular therefrom, a shear pin of predetermined resistance to shear, a bolt having a head at a first end and a second end adapted to receive said shear pin, a sleeve adapted to receive said bolt and said shear pin, said bolt, said sleeve and said shear pin connecting said second object to said first object, said prongs being positioned between said head and said second object, said bolt having its head against said prongs and extending therebetween and through said second object and said first object, said sleeve inserted over the end of said bolt and against said first object, said shear pin inserted through said sleeve and said second end of said bolt to hold said first object to said second object, and intercepting means on said third object positioned to intercept and to pivot said lever arm upon one rotation of said second object, said lever arm extending from said second object such that upon being pivoted about said first shaft by interception with said intercepting means said prongs will move said bolt at least partially through said second object and such movement of said bolt will shear said shear pin and free said first object from said second object.

6. The device claimed in claim 5 wherein said intercepting means includes a trigger, said intercepting means having a second shaft about which said trigger rotates, and arresting means on said intercepting means for restricting rotation of said trigger thereby causing said trigger to intercept and pivot said lever arm.

7. The device claimed in claim 5 wherein said intercepting means includes a second shaft mounted on said third object and a trigger assembly comprising a trigger having at least a first tang and a second tang, said trigger pivotable about said second shaft, said trigger assembly disposed relative to said lever arm such that said first tang will be intercepted by said lever arm upon a selected rotation of a number of rotations of said second object, said trigger pivoting about said second shaft upon the interception of said first tang with said lever arm, a stop on said trigger assembly positioned to limit the travel of said first tang, said trigger having a configuration such that when said first tang is against said stop said second tang will occupy the position said first tang occupied before pivoting of said trigger, said second tang adapted to intercept said lever arm upon two or less rotations of said second object and to pivot said lever arm about said first shaft.

8. The device claimed in claim 2 wherein said actuating means includes a trigger, said actuating means having a first shaft about which said trigger rotates, and arresting means on said actuating means for restricting rotation of said trigger thereby causing said trigger to intercept and pivot said shear operating means.

9. The device claimed in claim 2 wherein said actuating means includes a first shaft mounted on said third object and a trigger assembly comprising a trigger having at least a first tang and a second tang, said trigger pivotable about said first shaft, said trigger assembly disposed relative to said shear operating means such that said first tang will be intercepted by said shear operating means upon one rotation of said second object, said trigger pivoting about said second shaft upon the interception of said first tang with said shear operating means, a stop on said trigger assembly positioned to limit the travel of said first tang, said trigger having a configuration such that when said first tang is against said stop said second tang will occupy the position said first tang occupied before pivoting of said trigger, said second tang adapted to intercept said shear operating means upon a second rotation of said second object and to pivot said lever arm about said first shaft.

10. The device claimed in claim 2 wherein said actuating means includes a second shaft mounted on said third object and a trigger assembly comprising a trigger having at least a first tang and a second tang and pivotable about said second shaft, said trigger disposed relative to said shear operating means such that said first tang will be intercepted first by said shear operating means upon one rotation of said second object, a keeper positioned on said third object for retaining said second tang under predetermined compression, said keeper adapted to free said second tang upon said shear operating means intercepting said first tang, travel limit means for limiting the rotation of said trigger in a selected direction, said travel limit means disposed to permit rotation of said second tang into the position relative to said shear operating means which was previously occupied by said first tang, said keeper adapted to restrict rotation of said trigger in a direction opposite to said selected direction upon said second tang being rotated free of said keeper, said second tang adapted to intercept said shear operating means upon a second object and to pivot said lever arm about said first shaft.

11. The device claimed in claim 2 wherein said second object includes a plurality of arms extending an equal distance from the axis of rotation thereof, and rotating means positioned on said second object for providing rotation thereof, said rotating means including at least one miniature rocket disposed on said arms so as to exert a force substantially perpendicular to the respective arm on which said rocket is disposed.

12. A spin release mechanism for releasing a first object from a second object wherein the second object is rotatably mounted on a third object comprising, a shear assembly mounted on said second object and including shear means shearably holding said second object to said first object, rotating means mounted on said second object for rotating said first and second objects with respect to said third object, and actuating means operable with respect to said shear assembly for actuating said shear means thereby releasing said first object, from said second object.

13. A spin release mechanism for releasing a first object from a second object wherein the second object is rotatably mounted on a third object comprising, a shear assembly mounted on said second object and including shear means shearably holding said second object to said first object, rotating means mounted on said second object for rotating said first and second objects with respect to said third object, and actuating means mounted on said third object for actuating said shear means thereby releasing said first object from said second object.

14. The device claimed in claim 13 wherein said rotating means includes at least one energy source disposed so as to impart upon release a selected rotary force to said second object, and means for actuating said energy source at a selected time.

15. The device claimed in claim 14 wherein said rotary force is obtained through release of gas.

16. A spin release mechanism for releasing a first object from a second object wherein the second object is rotatably mounted on a third object comprising, a shear assembly mounted on said second object and including shear means shearably uniting said second object and said first object, spin producing means mounted on said second object for imparting a selected rotary force to said first and second objects with respect to said third object, said spin producing means including at least two jet propulsion means symmetrically positioned with respect to the axis of rotation of said second object so as to impart complementary forces thereto, and means for actuating said jet propulsion means in response to a selected state of said first object.

References Cited in the file of this patent
UNITED STATES PATENTS

| | | |
|---|---|---|
| 2,779,283 | Baughman | Jan. 29, 1957 |
| 2,792,784 | Corrick et al. | May 21, 1957 |
| 2,871,762 | Schmued | Feb. 3, 1959 |